(12) United States Patent
Aliane

(10) Patent No.: US 10,072,989 B2
(45) Date of Patent: Sep. 11, 2018

(54) HEAT-SENSITIVE RESISTANCE DEVICE

(71) Applicant: Commissariat à l'Energie Atomique et aux Energies Alternatives, Paris (FR)

(72) Inventor: Abdelkader Aliane, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 380 days.

(21) Appl. No.: 15/079,956

(22) Filed: Mar. 24, 2016

(65) Prior Publication Data
US 2016/0282196 A1 Sep. 29, 2016

(30) Foreign Application Priority Data

Mar. 27, 2015 (FR) ...................................... 15 52607

(51) Int. Cl.
*G01K 7/24* (2006.01)
*H01C 7/04* (2006.01)
*G01K 7/22* (2006.01)
*H01C 1/14* (2006.01)
*H01C 13/02* (2006.01)

(52) U.S. Cl.
CPC ................. *G01K 7/24* (2013.01); *G01K 7/22* (2013.01); *H01C 1/1413* (2013.01); *H01C 7/04* (2013.01); *H01C 7/041* (2013.01); *H01C 13/02* (2013.01)

(58) Field of Classification Search
None
See application file for complete search history.

(56) References Cited

U.S. PATENT DOCUMENTS

| 2,795,680 | A | * | 6/1957 | Peck | ........................ | C08K 3/04 |
| | | | | | | 252/511 |
| 5,582,757 | A | | 12/1996 | Kio et al. | | |
| 5,709,776 | A | * | 1/1998 | Coleman | ................ | D21H 19/24 |
| | | | | | | 162/135 |
| 6,081,182 | A | | 6/2000 | Tomozawa et al. | | |
| 9,281,104 | B2 | * | 3/2016 | Sun | .......... | H01C 1/14 |
| 2012/0161587 | A1 | | 6/2012 | Kim et al. | | |

(Continued)

FOREIGN PATENT DOCUMENTS

GB 1287930 A 9/1972

OTHER PUBLICATIONS

Search Report filed in FR 15/52607, dated Jan. 15, 2016, 2 pgs.

(Continued)

*Primary Examiner* — Christopher Mahoney
*Assistant Examiner* — Leon W Rhodes, Jr.
(74) *Attorney, Agent, or Firm* — Moreno IP Law LLC

(57) ABSTRACT

A device including: a paper film including cellulose fibers, a first surface, and a second surface opposite to the first surface; and at least one first heat-sensitive resistor having a negative temperature coefficient, the first heat-sensitive resistor including a first electrode arranged on the first surface, a second electrode arranged on the second surface, the first and second electrodes having at least first portions facing each other, the first heat-sensitive resistor further including the portion of the paper film arranged between the first portions facing each other. The invention also relates to a method of manufacturing such a device.

13 Claims, 4 Drawing Sheets

(56) References Cited

U.S. PATENT DOCUMENTS

2015/0023393 A1     1/2015   Britton et al.
2015/0321908 A1    11/2015   Wagner et al.

OTHER PUBLICATIONS

International Search Report filed in FR 15/52434, dated Feb. 15, 2016, 3 pgs.

"Characteristics and Performance of Electroactive Paper Actuator Made with Cellulose/Polyurethan Semi-Interpenetrating Polymer Networks"; Cai Zhijiang, et al.; Journal of Applied Polymer Science; vol. 109, No. 6; Sep. 15, 2008; 6 pgs.

"Electrical and Electromechanical Properties of Cellulose-Polypyrrole-Ionic Liquid Nanocomposite: Effect of Polymerization Time"; Suresha K. Mahadeva, et al.; IEEE Transactions of Nanotechnology; vol. 10, No. 3; May 1, 2011; 5 pgs.

"The Preparation, Characterization and Actuation Behavior of Polyaniline and Cellulose Blended Electro-Active Paper"; John Amalraj, et al.; Smart Materials and Structures; vol. 19, No. 4; Apr. 1, 2010; 6 pgs.

"Characteristics and Bending Performance of Electroactive Polymer Blend Made with Cellulose and Poly (3-Hydroxybutyrate)"; Cai Zhijiang, et al.; Carbohydrate Polymers, Applied Science Publishers, Ltd; vol. 87, No. 1; Aug. 16, 2011; 7 pgs.

"Cellulose Electro-Active Paper: From Discovery to Technology Applications"; Zafar Abas, et al.; Frontiers in Materials; Sep. 30, 2014; vol. 1, Article 17; 4 pgs.

\* cited by examiner

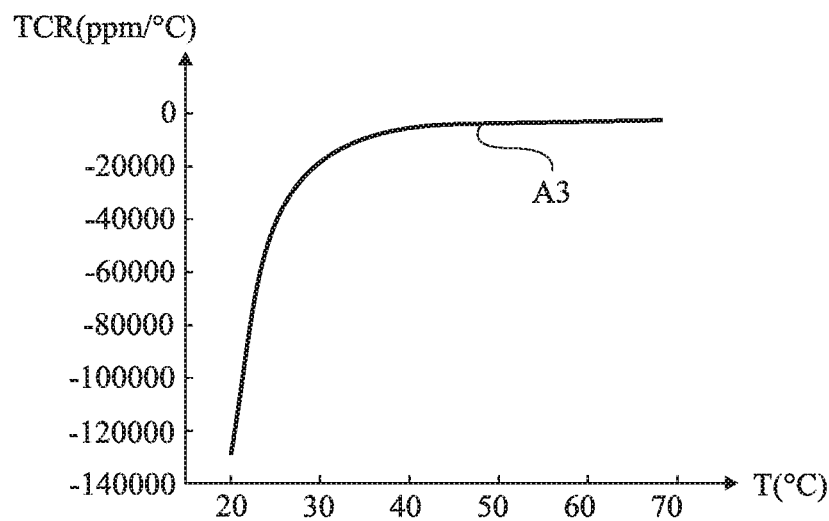
Fig 5
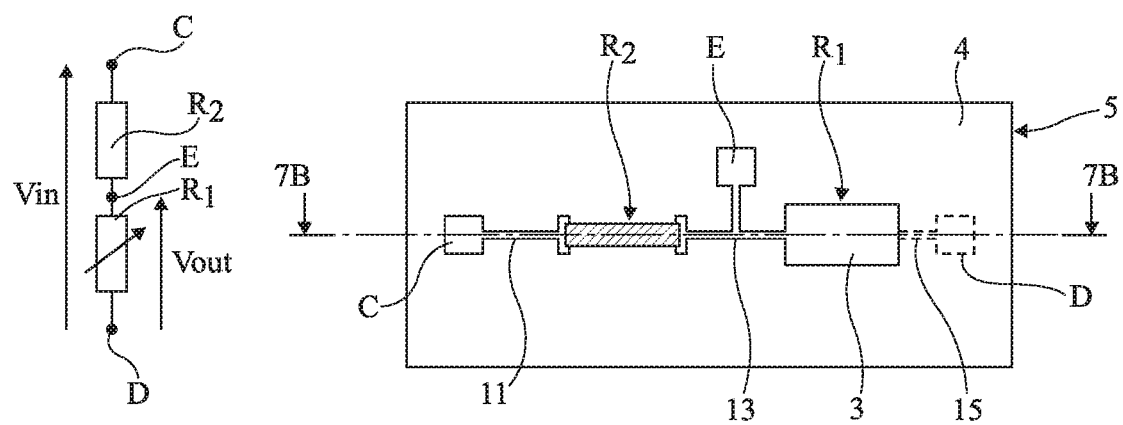
Fig 6
Fig 7A
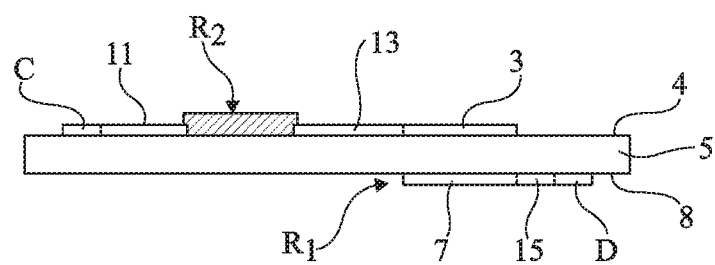
Fig 7B

HEAT-SENSITIVE RESISTANCE DEVICE

CROSS-REFERENCE TO RELATED APPLICATION

The instant application is related to U.S. patent application Ser. No. 15/076,942 filed on Mar. 22, 2016. Additionally, this application claims the priority benefit of French patent application number 15/52607, filed on Mar. 27, 2015, the content of which is hereby incorporated by reference in its entirety to the maximum extent allowable by law.

BACKGROUND

The present disclosure relates to heat-sensitive resistance devices, particularly for the forming of temperature sensors. The present disclosure also relates to a method of manufacturing such heat-sensitive resistance devices.

DISCUSSION OF THE RELATED ART

Heat-sensitive resistors may have a negative temperature coefficient and are then currently called NTC resistors, or a positive temperature coefficient, and are then currently called PTC resistors. For an NTC resistor, the value of the resistance decreases as the temperature increases. For a PTC resistor, the value of the resistance increases as the temperature increases.

Heat-sensitive resistance devices where heat-sensitive resistors are arranged on a substrate, for example, made of glass or of plastic, particularly polyethylene naphthalate (PEN) or polyethylene terephthalate (PET), are known. The resistors are formed from heat-sensitive resistive pastes arranged on the substrate.

A first disadvantage of such devices is that heat-sensitive pastes generally have a high manufacturing cost.

A second disadvantage of such devices is that their manufacturing process is polluting due to the fact that the manufacturing of heat-sensitive pastes and the deposition thereof on the substrate require using chemical products, particularly solvents, which may be toxic.

A third disadvantage of such devices is that they are bulky due to the fact that the resistors occupy a large substrate surface area.

In the specific case of devices having a flexible plastic film as a substrate, a fourth disadvantage of such devices is that the heat-sensitive pastes may crack when the plastic film is deformed, for example to follow the shape of a non-planar surface, which may cause a malfunction of the devices.

It would be desirable to have a heat-sensitive resistance device and a method of manufacturing such a device which overcome at least some of the above-mentioned disadvantages.

SUMMARY

Thus, an embodiment provides a device comprising a paper film comprising cellulose fibers, a first surface, and a second surface opposite to the first surface; and at least one first heat-sensitive resistor having a negative temperature coefficient, the first heat-sensitive resistor comprising a first electrode arranged on the first surface, a second electrode arranged on the second surface, the first and second electrodes having at least first portions facing each other, the first heat-sensitive resistor further comprising the portion of the paper film arranged between the first portions facing each other.

According to an embodiment, an additive selected from the group comprising 2-2 diphenylethyl isocyanate, nitrophenyl isocyanate, 1-adanatyl isocyanate, and cyanophenyl isocyanate is grafted to the cellulose fibers of the paper film.

According to an embodiment, the paper film comprises at least 40% by weight of cellulose fibers.

According to an embodiment, the first heat-sensitive resistor further comprises a third electrode arranged on the first surface of the paper film, the second and third electrodes having at least second portions facing each other, the first heat-sensitive resistor further comprising the portion of the paper film arranged between the second portions facing each other.

According to an embodiment, the thickness of the paper film is in the range from 50 to 300 µm.

According to an embodiment, the device comprises at least one second resistor comprising a resistive element on the first surface or on the second surface.

According to an embodiment, the first heat-sensitive resistor and the second resistor are assembled as a voltage dividing bridge.

According to an embodiment, the device comprises a Wheatstone bridge comprising two first heat-sensitive resistors and two second resistors.

An embodiment also provides a temperature sensor comprising a device such as previously defined.

An embodiment also provides a manufacturing method comprising the steps of: a) providing a paper film comprising cellulose fibers, a first surface, and a second surface opposite to the first surface; b) forming a first heat-sensitive resistor having a negative temperature coefficient by forming a first electrode on the first surface, and a second electrode on the second surface, the first and second electrodes having at least first portions facing each other, the first heat-sensitive resistor further comprising the portion of the paper film arranged between the first portions facing each other.

According to an embodiment, step b) further comprises forming a third electrode arranged on the first surface of the paper film, the second and third electrodes having at least second portions facing each other, the first heat-sensitive resistor further comprising the portion of the paper film arranged between the second portions facing each other.

According to an embodiment, the method further comprises step c) of: c) forming a second resistor by depositing a resistive paste on the first surface or on the second surface.

According to an embodiment, the method further comprises the following successive steps d) and e) between step a) and step b): d) dipping the paper film into a solution comprising at least one additive selected from the group comprising 2-2 diphenylethyl isocyanate, nitrophenyl isocyanate, 1-adanatyl isocyanate, and cyanophenyl isocyanate; and e) grafting the additive to the cellulose fibers of the paper film.

According to an embodiment, step e) comprises exposing the paper film to pulses of an ultraviolet radiation.

According to an embodiment, the pulses have a duration in the range from 0.5 to 2 ms and an energy fluence in the range from 5 to 20 J/cm$^2$.

The foregoing and other features and advantages will be discussed in detail in the following non-limiting description of specific embodiments in connection with the accompanying drawings.

BRIEF DESCRIPTION OF THE DRAWINGS

FIGS. 4 and 5 show curves of the temperature variation of the sensitivity of two embodiments of the NTC resistor of FIG. 1;

FIG. 6 schematically shows a circuit of a temperature sensor comprising a voltage-dividing bridge;

FIGS. 7A and 7B respectively are simplified top and cross-section views of an embodiment of the temperature sensor of FIG. 6;

DETAILED DESCRIPTION

Figure 1:
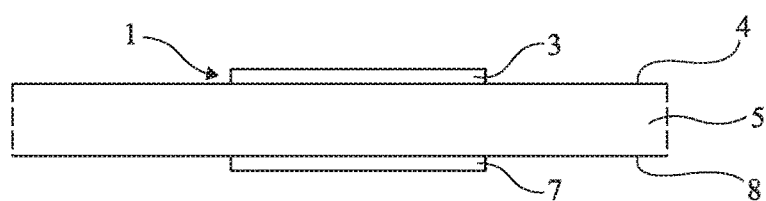
FIG. 1 is a simplified cross-section view of device comprising an NTC resistor.

The same elements have been designated with the same reference numerals in the different drawings and, further, the various drawings are not to scale. In the following description, terms "upper" and "lower" refer to the orientation of the concerned elements in the corresponding drawings. Unless otherwise specified, terms "approximately" and "substantially" mean to within 10%, preferably to within 5%. In the following description, expression "paper film" designates a film comprising more than 40% by weight of cellulose fibers.

It is here provided to form a device comprising a heat-sensitive resistor by using a paper film rather than a plastic or glass substrate. Indeed, the inventor has observed that the value of the electric resistance of a paper film decreases as the temperature increases. The inventor thus provides using the paper film to form an NTC resistor of the device.

FIG. 1 is a simplified cross-section view of an embodiment of a device comprising an NTC resistor 1. The device comprises an electrode 3 resting on upper surface 4 of a paper film 5 and an electrode 7 resting on lower surface 8 of film 5. At least a portion of electrode 3 faces at least a portion of electrode 7. In the shown embodiment, the surface of electrode 3 in contact with upper surface 4 of film 5 has the same area as the surface of electrode 7 in contact with lower surface 8 of film 5, and the entire surface of electrode 3 in contact with film 5 faces the surface of electrode 7 in contact with film 5. NTC resistor 1 is formed by electrodes 3, 7, which correspond to the two terminals of NTC resistor 1, and by the portion of paper film 5 extending between the portions facing each other of electrodes 3 and 7.

As an example, the surfaces facing each other of electrodes 3 and 7 have an area in the range from 50 to 1,000 µm². The electrode thickness may be in the range from 10 to 300 nm, for example, approximately 100 nm. Each electrode 3, 7 for example comprises a metal selected from the group comprising gold, copper, silver, titanium, and metal alloys comprising at least one of these metals. Each electrode 3, 7 may also be made of an electrically-conductive polymer, for example, of poly(3,4-ethylenedioxythiophene):(poly(styrene sulfonate), currently called PEDOT:PSS.

The thickness of paper film 5 may be in the range from 50 to 300 µm, for example, 200 µm. Paper film 5 may be a flexible film having a flexible behavior, that is, it may, under the action of an external force, deform, and particularly bend, without breaking or tearing. Paper film 5 is, for example, a paper film commercialized under trade name PowerCoat by Arjowiggins. Paper film 5 may comprise, on upper and lower surfaces 4 and 8, layers favoring the bonding of electrodes 3 and 7 to surfaces 4 and 8. Such bonding layers may comprise 3-aminopropyl trimethyloxysilane.

The surface area occupied on film paper 5 by NTC resistor 1, which corresponds to the surface of electrode 3, is decreased as compared with the surface area which would be occupied by an NTC resistor of equivalent value comprising a heat-sensitive paste and electrodes arranged on a substrate.

Since NTC resistor 1 comprises no heat-sensitive paste, NTC resistor 1 has a lower manufacturing cost than an NTC resistor of equivalent value comprising a heat-sensitive paste on a substrate, and the method of manufacturing NTC resistor 1 is less polluting than that of an NTC resistor comprising a heat-sensitive paste.

In the specific case where the paper film is flexible and intended to be deformed, NTC resistor 1 has a better mechanical resistance than an NTC resistor of equivalent value comprising a heat-sensitive paste on a flexible substrate.

Figure 2:
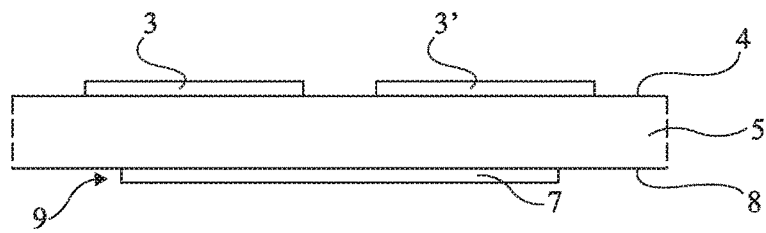
FIG. 2 is a simplified cross-section view of an alternative embodiment of the device of FIG. 1.

FIG. 2 is a simplified cross-section view of an alternative embodiment of the device of FIG. 1. In this variation, the device comprises an NTC resistor 9 comprising a first NTC resistor series-connected with a second NTC resistor, the first and second resistors each having a structure similar to that of NTC resistor 1 of FIG. 1. As compared with NTC resistor 1, NTC resistor 9 comprises an additional electrode 3' resting on upper surface 4 of paper film 5. Electrode 7 of NTC resistor 9 has a first portion facing all or part of electrode 3, and a second portion facing all or part of electrode 3'.

Thus, NTC resistor 9 comprises a first NTC resistor formed by the portions facing each other of electrodes 3 and 7 and by the portion of paper film 5 extending between these portions facing each other. NTC resistor 9 comprises a second NTC resistor formed by the portions facing each other of electrodes 7 and 3' and by the portion of paper film 5 extending between these portions facing each other.

In this alternative embodiment, the two terminals of NTC resistor 9, which correspond to electrodes 3 and 3', are advantageously arranged on the same surface 4 of film 5. This simplifies the access to these terminals. Further, NTC resistor 9 keeps the advantages of NTC resistor 1 as compared with a resistor comprising a heat-sensitive paste on a substrate due to the fact that the NTC resistor 9 comprises no heat-sensitive paste.

Figure 3:
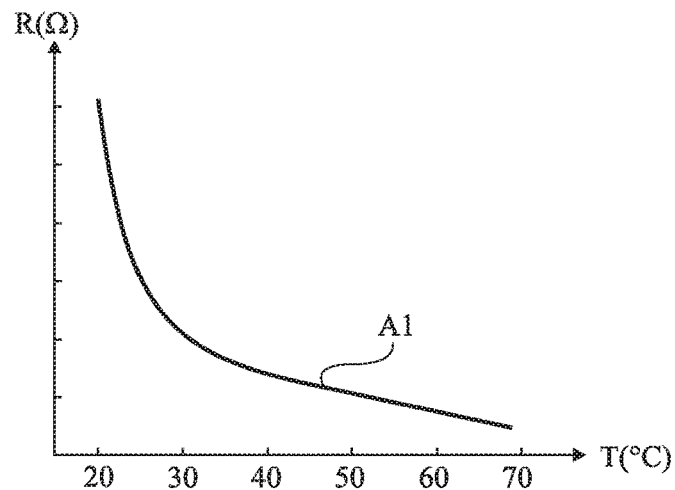
FIG. 3 shows a curve of the temperature variation of the value of the NTC resistor of FIG. 1.

FIG. 3 shows a curve A1 of the variation of value R, expressed in ohms (Ω) in an arbitrary linear scale, according to temperature T, expressed in degrees Celsius (° C.), of NTC resistor 1. Curve A1 shows that, for temperatures approximately in the range from 20 to 70° C., the value of NTC resistor 1 decreases as the temperature increases.

The variation coefficient of a heat-sensitive resistor of value R with temperature T, or TCR, is equal to $(1/R)*(dR/dT)$. The higher the absolute value of the TCR, the higher the sensitivity of the resistor.

Figure 4:
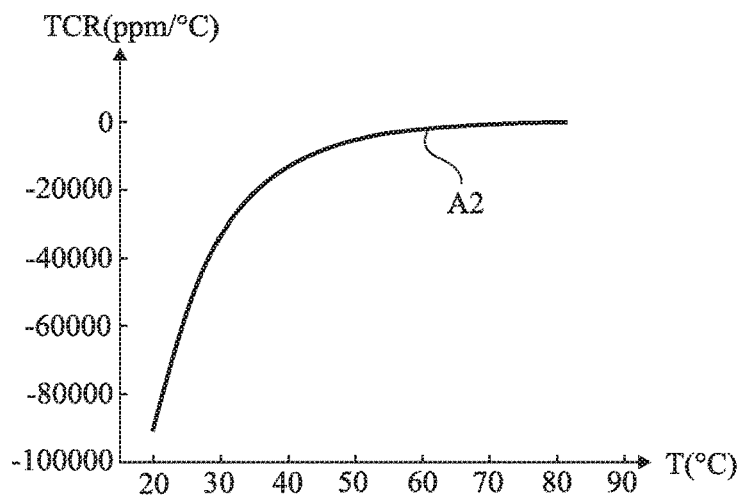

FIG. 4 shows a curve A2 of the variation of the TCR, expressed in parts per million per degree Celsius (ppm/° C.), according to temperature T, expressed in degrees Celsius (° C.), of NTC resistor 1. Curve A2 is obtained for a paper film 5 having a 300-μm thickness, and for silver electrodes 3 and 7 and with its surfaces facing each other having a 10 mm² area.

Curve A2 shows that, between approximately 20 and 70° C., the absolute value of the TCR decreases as the temperature increases. Generally, the preferred range of use of a heat-sensitive resistor may correspond to the temperature range for which the absolute value of the TCR is higher than a threshold. In the case of the NTC resistor 1 used to obtain curve A2, the threshold may be $0.5*10^{-2} \circ C.^{-1}$, which correspond to a preferred range of use approximately ranging from 20 to 40° C.

According to an alternative embodiment, additives may be grafted to the cellulose fibers of paper film 5 of NTC resistors 1 and 9. For example, at least one additive selected from the group comprising 2-2 diphenylethyl isocyanate, nitrophenyl isocyanate, 1-adamantyl isocyanate, and cyanophenyl isocyanate, is grafted to the cellulose fibers of paper film 5. The paper film may comprise from 0.1 to 10% by weight of the additive.

FIG. 5 shows a curve A3 of the variation of the TCR according to the temperature of NTC resistor 1 in the case where such an additive is grafted to paper film 5. More particularly, curve A3 is obtained with an NTC resistor 1 similar to NTC resistor 1 used to obtain curve A2 and further comprising nitrophenyl isocyanate which is grafted to the cellulose fibers of paper film 5, the percentage by weight of the additive in paper film 5 being approximately 10%.

Similarly to curve A2, curve A3 shows that the absolute value of the TCR decreases as the temperature increases. By selecting the same TCR threshold value as in the case of curve A2, the preferred range of use of NTC resistor 1 corresponding to curve A3 extends from approximately 20 to 40° C., and is substantially identical to that of NTC resistor 1 corresponding to curve A2. However, over this preferred range of use and for a given temperature value, the absolute value of the TCR of curve A3 is greater than that of curve A2.

Thus, the grafting of one of the above-mentioned additives to the cellulose fibers of paper film 5 of NTC resistor 1 causes an increase of the sensitivity of NTC resistor 1. Further, the extent of the preferred range of use is substantially the same in the presence or in the absence of additives.

NTC resistors 1 and 9 described in relation with FIGS. 1 to 5 may also be used to form a temperature sensor comprising a single NTC resistor 1 or 9, or comprising a plurality of resistors, including at least one NTC resistor 1 or 9, for example, assembled as a voltage-dividing bridge or as a Wheatstone bridge.

FIG. 6 shows a circuit of a temperature sensor comprising a voltage-dividing bridge. The voltage-dividing bridge comprises, between a terminal C and a terminal D, an NTC resistor $R_1$ series-connected with a resistor $R_2$. Call E a terminal between resistors $R_1$ and $R_2$. In the following description, the same symbol is used to designate a resistor or to designate the value of this resistor.

In operation, voltage Vout measured between terminals E and D depends on voltage Vin applied between terminals C and D according to the following relation (1):

$$Vout = Vin * \frac{R_1}{R_1 + R_2} \quad (1)$$

Due to the fact that a temperature variation causes a variation of K1, the measured value of voltage Vout depends on temperature.

Resistor $R_2$ may have a constant value. Resistor $R_2$ may also be an NTC or PTC resistor. Resistor $R_2$ is for example a heat-sensitive resistor having a preferred range of use at least partly common with the preferred range of use of resistor $R_1$. The sensitivity of the temperature sensor is then increased on this common range of use. Resistor $R_2$ is for example a heat-sensitive resistor having a preferred range of use at least partly different from that of $R_1$. This provides a temperature sensor having a total range of use wider than that of resistor $R_1$ or of resistor $R_2$.

FIGS. 7A and 7B respectively are simplified top and cross-section views showing an embodiment of the temperature sensor of FIG. 6, FIG. 7B being a cross-section view along plane 7B-7B of FIG. 7A. In this embodiment, NTC resistor $R_1$ has the same structure as NTC resistor 1 of FIG. 1 and resistor $R_2$ is a PTC resistor.

Terminal C and terminal E rest on upper surface 4 of paper film 5. Terminal D, shown in dotted lines in FIG. 7A, rests on lower surface 8 of film 5. PTC resistor $R_2$ rests on the upper surface of film 5. One end of PTC resistor $R_2$ is connected to terminal C by a conductive track 11, and the other end of PTC resistor $R_2$ is connected by a conductive track 13 to terminal E and to electrode 3 of NTC resistor $R_1$. Tracks 11 and 13 rest on upper surface 4 of paper film 5. A conductive track 15, shown in dotted lines in FIG. 7A, rests on lower surface 8 of film 5 and connects electrode 7 of NTC resistor $R_1$ to terminal D.

As an example, tracks 11, 13, and 15, and terminals C, D, and E are made of the same material and have the same thickness as electrodes 3 and 7. PTC resistor $R_2$ further comprises a track of a carbon black paste in a matrix of a thermoplastic polymer. PTC resistor $R_2$ may have a length greater than 300 μm, a width greater than 150 μm, and a thickness in the range from 5 to 20 μm, for example, 10 μm. PTC resistor $R_2$ may have a preferred range of use extending from 40 to 90° C. In the case where NTC resistor $R_1$ corresponds to the NTC resistor 1 used to obtain previously-described curves A1, A2, or A3, the total range of use of the temperature sensor may then extend from 20 to 90° C.

In an alternative embodiment, NTC resistor $R_1$ has the same structure as NTC resistor 9. In this case, conversely to the sensor shown in FIGS. 7A and 7B, conductive track 15 and terminal D rest on upper surface 4 of film 5, and track 15 connects terminal D to electrode 3' rather than to electrode 7. Thus, all terminals C, D, and E are formed on the upper surface of film 5. As a result, the access to terminals C, D, and E to apply voltage Vin and to measure voltage Vout is simplified with respect to the sensor shown in FIGS. 7A and 7B.

Figure 8:
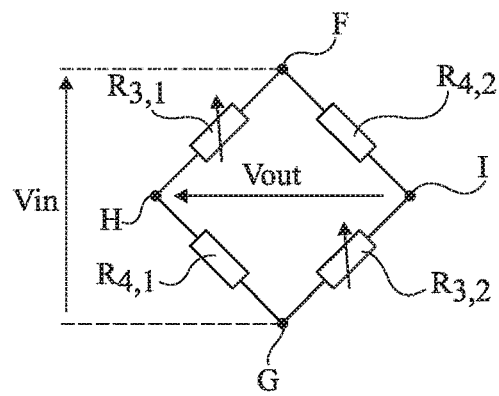
FIG. 8 schematically shows a circuit of a temperature sensor comprising a Wheatstone bridge.

FIG. 8 shows a circuit of a temperature sensor comprising a Wheatstone bridge.

The Wheatstone bridge comprises, between terminals F and G, a first branch comprising an NTC resistor $R_{3,1}$ series-connected with a resistor $R_{4,1}$ and, in parallel with the first branch, a second branch comprising a resistor $R_{4,2}$ series-connected with an NTC resistor $R_{3,2}$. The junction points of the first and second branches are designated with respective references H and I.

In operation, a bias voltage Vin is applied between terminals F and G, and a voltage Vout is measured between terminals H and I. When NTC resistors $R_{3,1}$ and $R_{3,2}$ have a same value $R_3$, and resistors $R_{4,1}$ and $R_{4,2}$ have a same value $R_4$, voltage Vout depends on voltage Vin according to the following relation (2):

$$Vout = Vin * \left(\frac{R_4 - R_3}{R_4 + R_3}\right) \quad (2)$$

Due to the fact that a temperature variation causes a variation of $R_3$, the measured voltage Vout depends on temperature.

Resistors $R_{4,1}$, $R_{4,2}$ may have constant values, correspond to NTC resistors, or correspond to PTC resistors.

Figure 9A:
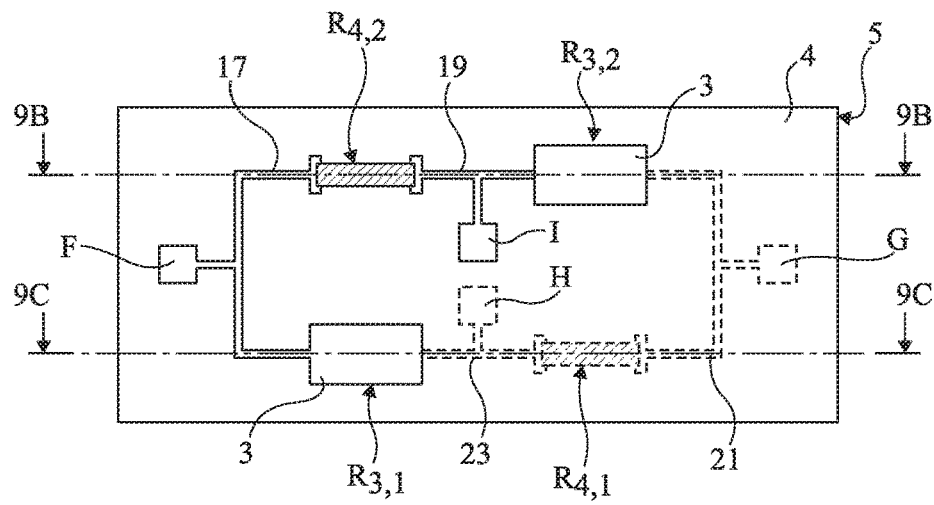
FIGS. 9A, 9B, and 9C respectively are a simplified top view and simplified cross-section views of an embodiment of the temperature sensor of FIG. 8.
Figure 9B:
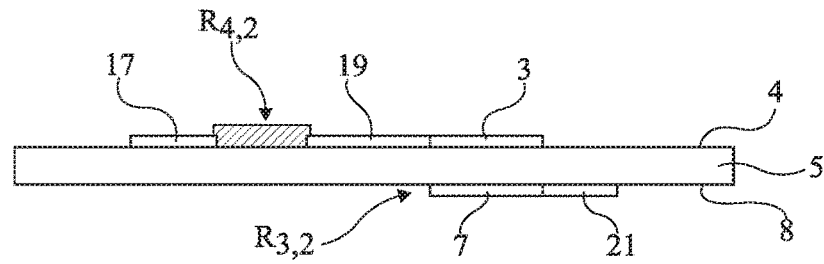
Figure 9C:
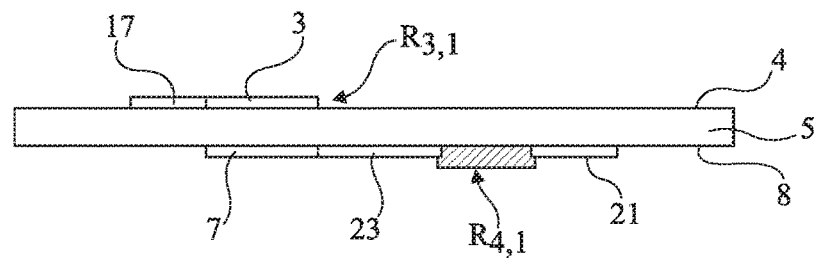

FIGS. 9A to 9C schematically show an embodiment of the temperature sensor of FIG. 8, FIG. 9A being a top view and FIGS. 9B and 9C being cross-section views along respective planes 9B-9B and 9C-9C of FIG. 9A. In this embodiment, each NTC resistor $R_{3,1}$, $R_{3,2}$ has the same structure as NTC resistor 1 of FIG. 1, and each resistor $R_{4,1}$, $R_{4,2}$ has the same structure as PTC resistor $R_2$ of FIGS. 7A and 7B.

Terminals F and I rest on upper surface 4 of paper film 5, and terminals G and H rest on lower surface 8 of film 5. PTC resistor $R_{4,2}$ rests on upper surface 4 of film 5 and PTC resistor $R_{4,1}$ rests on lower surface 8 of film 5. A conductive track 17 rests on upper surface 4 of paper film 5 and connects together one end of PTC resistor $R_{4,2}$, terminal F, and electrode 3 of NTC resistor $R_{3,1}$. A conductive track 19 rests on upper surface 4 of paper film 5 and connects together the other end of PTC resistor $R_{4,2}$, terminal I, and electrode 3 of NTC resistor $R_{3,2}$. A conductive track 21 rests on lower surface 8 of film 5 and connects together one end of PTC resistor $R_{4,1}$, terminal G, and electrode 7 of NTC resistor $R_{3,2}$. A conductive track 23 rests on lower surface 8 of film 5 and connects together the other end of PTC resistor $R_{4,1}$, terminal H, and electrode 7 of NTC resistor $R_{3,1}$. As an example, conductive tracks 17, 19, 21, and 23, and terminals F, G, H, and I are made of the same material and have the same thickness as electrodes 3 and 7.

Figure 10A:
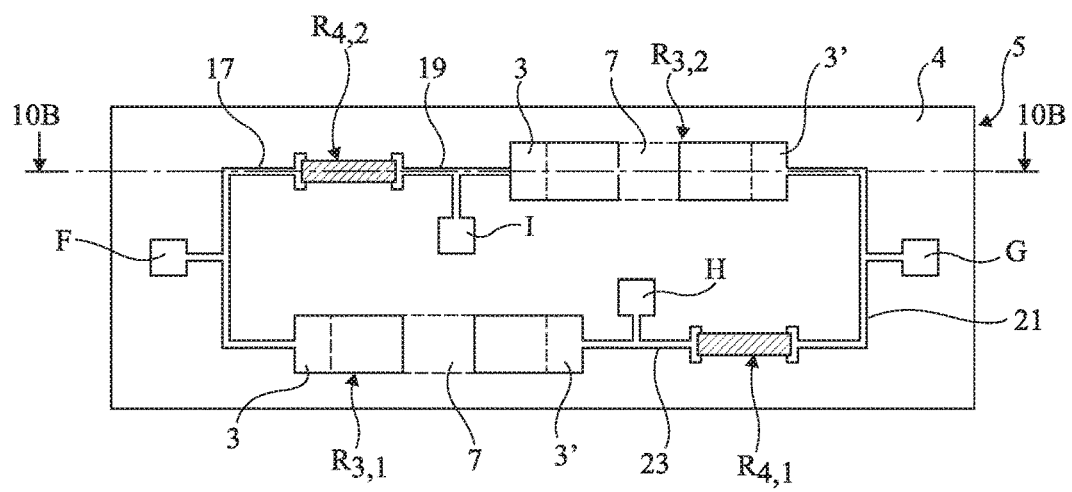
FIGS. 10A and 10B respectively are simplified top and cross-section views of an alternative embodiment of the temperature sensor shown in FIGS. 9A to 9C.
Figure 10B:
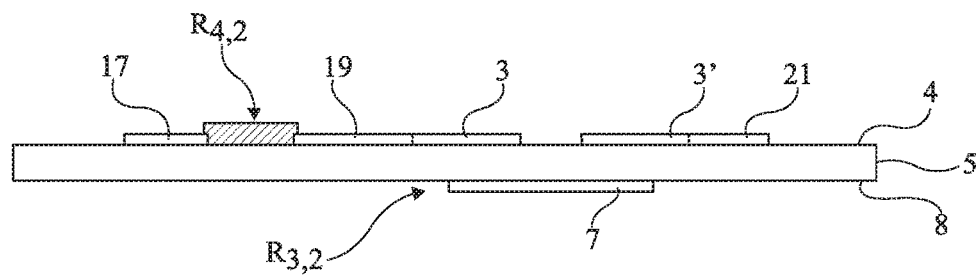

FIGS. 10A and 10B respectively are a simplified top view and cross-section view of an alternative embodiment of the temperature sensor shown in FIGS. 9A to 9C, FIG. 10B being a cross-section view along plane 10B-10B of FIG. 10A. In this variation, unlike the temperature sensor shown in FIGS. 9A to 9C, each NTC resistor $R_{3,1}$ and $R_{3,2}$ has the same structure as NTC resistor 9 of FIG. 2. Further, PTC resistor $R_{4,1}$, terminals G and H, and tracks 21 and 23 rest on upper surface 4 of film 5. Tracks 21 and 23 are then connected to electrodes 3' and not to electrodes 7 of NTC resistors $R_{3,1}$ and $R_{3,2}$.

Thus, PTC resistors $R_{4,1}$, $R_{4,2}$, and terminals F, G, H, and I all rest on upper surface 4 of film 5. As a result, PTC resistors $R_{4,1}$, $R_{4,2}$ may be formed simultaneously. Further, the access to terminals F, G, H, and I to apply voltage Vin and to measure voltage Vout is simplified as compared with the case of the temperature sensor shown in FIGS. 9A to 9C.

Figure 11A:
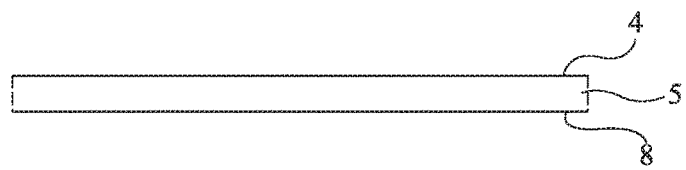
FIGS. 11A to 11C are simplified cross-section views illustrating steps of an embodiment of a method of manufacturing the temperature sensor shown in FIGS. 7A and 7B.
Figure 11B:
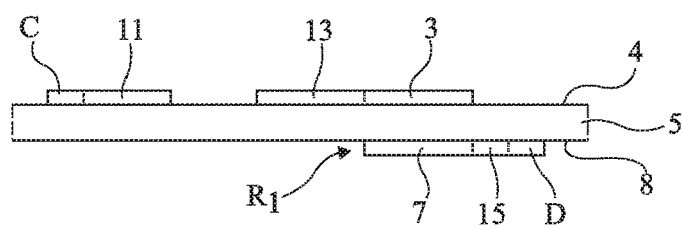
Figure 11C:
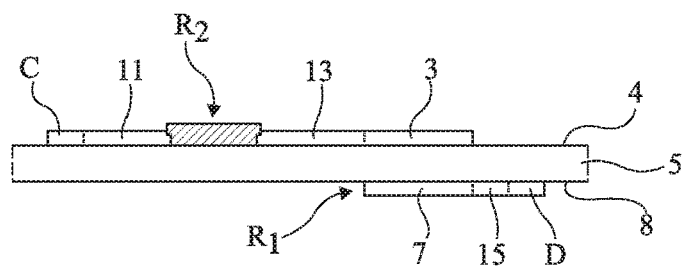

FIGS. 11A to 11C are simplified views showing structures obtained at successive steps of an embodiment of a method of manufacturing the temperature sensor shown in FIGS. 7A and 7B.

FIG. 11A shows a structure obtained after a treatment for grafting to the cellulose fibers of paper film 5 at least one additive selected from the group comprising 2-2 diphenylethyl isocyanate, nitrophenyl isocyanate, 1-adanatyl isocyanate, and cyanophenyl isocyanate. The treatment comprises the successive steps of:

dipping film 5 into a solution comprising a solvent and the additive so that the additive penetrates into the entire volume of paper film 5;

drying film 5, for example, in free air, to evaporate the solvent; and grafting or bonding the additive to the cellulose fibers of film 5, for example, by exposing the film to pulses of an ultraviolet radiation.

As an example, the solvent is toluene. The solution for example comprises from 5 to 10% by weight of the additive. The film is dipped, for example, from 1 to 5 minutes into the solution. The ultraviolet pulses for example have a duration in the range from 0.5 to 2 ms and, for example, an energy fluence in the range from 5 to 20 J/cm². The pulses may be emitted by means of the equipment commercialized under trade name PulseForge by Novacentrix or under trade name Sinteron 2000 by Xenon Corporation.

As a variation, it is possible not to perform the treatment for grafting the additive to the cellulose fibers of paper film 5.

A bonding layer may be deposited on upper and lower surfaces 4 and 8 of film 5 to favor the bonding of the elements which will be subsequently formed on surfaces 4 and 8. This deposition may be a physical vapor deposition, for example, 3-aminopropyle trimethoxysilane.

FIG. 11B shows the structure obtained after having formed, for example, simultaneously, terminal C, terminal E (not shown in FIG. 11B), conductive tracks 11 and 13, and electrode 3 on upper surface 4 of film 5, and after having formed, for example, simultaneously, terminal D, conductive track 15, and electrode 7 on lower surface 8 of film 5.

According to the material forming the elements formed on upper and lower surface 4 and 8 of film 5, the forming method may correspond to a so-called additive process, for example, by direct printing of a fluid or viscous composition comprising the material comprising these elements at the desired locations, for example, by inkjet printing, heliography, silk-screening, flexography, spray coating, or drop-casting. According to the material forming the elements formed on upper and lower surfaces 4 and 8 of film 5, the forming method may correspond to a so-called subtractive method, where the material forming these elements is deposited all over upper surface 4 and/or lower surface 8 of film 5, and where the unused portions are then removed, for example, by photolithography or laser ablation. The deposition on surface 4 and/or surface 8 of film 5 may be performed, for example, by a liquid method, by cathode sputtering or by evaporation. Methods such as spin coating, spray coating, heliography, slot-die coating, blade coating, flexography, or silk-screening, may in particular be used. According to the implemented deposition method, a step of drying the deposited materials may be provided.

FIG. 11C shows the structure obtained after the forming on upper surface 4 of film 5 of PTC resistor $R_2$ in contact with tracks 11 and 13. The method of forming PTC resistor $R_2$ may correspond to an additive method such as previously described, particularly by inkjet, silk-screening, or spray coating. The method of forming PTC resistor $R_2$ may further correspond to a subtractive method such as previously described.

An advantage of the embodiment of the manufacturing method described in relation with FIGS. 11A to 11C is that it is not necessary to deposit a heat-sensitive paste and to anneal this paste to form NTC resistor $R_1$. As a result, the method is simpler, less polluting, and less expensive to implement than a manufacturing method comprising the forming of a NTC resistor from a heat-sensitive paste.

It should be understood that a large number of temperature sensors, for example, several thousands, may be simultaneously manufactured on a same paper film 5, film 5 being then cut to obtain individual temperature sensors.

Although, in relation with FIGS. 11A and 11C, a manufacturing method in the case where resistor $R_1$ has the same structure as NTC resistor 1 of FIG. 1 has been described, an additional electrode 3' may be formed at the step described in relation with FIG. 11B so that NTC resistor $R_1$ has the structure of NTC resistor 9 of FIG. 2.

Specific embodiments have been described in relation with FIGS. 1 to 11C. Various alterations, modifications, and improvements will occur to those skilled in the art. In particular, although the use of an NTC resistor in temperature sensors has been described, it should be understood that such a resistor may be used in other types of circuits formed on a paper film. Further, the PTC resistors may be formed from other heat-sensitive pastes than pastes comprising carbon black. Further, the number and the order of the steps of the previously-described method may be modified by those skilled in the art. For example, the order in which the tracks, the electrodes, and the terminals are formed on the lower and upper surface of the film may be modified.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device comprising:
   a paper film comprising cellulose fibers, a first surface, and a second surface opposite to the first surface; and
   at least one first heat-sensitive resistor of negative temperature coefficient, the first heat-sensitive resistor comprising a first electrode arranged on the first surface, a second electrode arranged on the second surface, the first and second electrodes having at least first portions facing each other, the first heat-sensitive resistor further comprising the portion of the paper film arranged between the first portions facing each other, wherein an additive selected from the group comprising 2-2 diphenylethyl isocyanate, nitrophenyl isocyanate, 1-adanatyl isocyanate, and cyanophenyl isocyanate is grafted to the cellulose fibers of the paper film.

2. The device of claim 1, wherein the paper film comprises at least 40% by weight of cellulose fibers.

3. The device of claim 1, wherein the first heat-sensitive resistor further comprises a third electrode arranged on the first surface of the paper film, the second and third electrodes having at least second portions facing each other, the first heat-sensitive resistor further comprising the portion of the paper film arranged between the second portions facing each other.

4. The device of claim 1, wherein the thickness of the paper film is in the range from 50 to 300 μm.

5. The device of claim 1, comprising at least one second resistor comprising a resistive element on the first surface or on the second surface.

6. The device of claim 5, wherein the first heat-sensitive resistor and the second resistor are assembled as a voltage-dividing bridge.

7. The device of claim 5, comprising a Wheatstone bridge comprising two first heat-sensitive resistors and two second resistors.

8. A temperature sensor comprising the device of claim 1.

9. A manufacturing method comprising the steps of:
   a) providing a paper film comprising cellulose fibers, a first surface, and a second surface opposite to the first surface;
   b) forming a first heat-sensitive resistor of negative temperature coefficient by forming a first electrode on the first surface, and a second electrode on the second surface, the first and second electrodes having at least first portions facing each other, the first heat-sensitive resistor further comprising the portion of the paper film arranged between the first portions facing each other,
   further comprising the following successive steps d) and e), between step a) and step b):
   d) dipping the paper film into a solution comprising at least one additive selected from the group comprising 2-2 diphenylethyl isocyanate, nitrophenyl isocyanate, 1-adanatyl isocyanate, and cyanophenyl isocyanate; and
   e) grafting the additive to the cellulose fibers of the paper film.

10. The method of claim 9, wherein step b) further comprises forming a third electrode on the first surface of the paper film, the second and third electrodes having at least second portions facing each other, the first heat-sensitive resistor further comprising the portion of the paper film arranged between the second portions facing each other.

11. The method of claim 9, further comprising step c) of:
   c) forming a second resistor by depositing a resistive paste on the first surface or on the second surface.

12. The method of claim 9, wherein step e) comprises exposing the paper film to pulses of an ultraviolet radiation.

13. The method of claim 12, wherein the pulses have a duration in the range from 0.5 to 2 ms and an energy fluence in the range from 5 to 20 J/cm2.

* * * * *